May 3, 1927.
O. R. BOYNTON
EGG BEATER
Filed Oct. 5, 1925
1,627,314
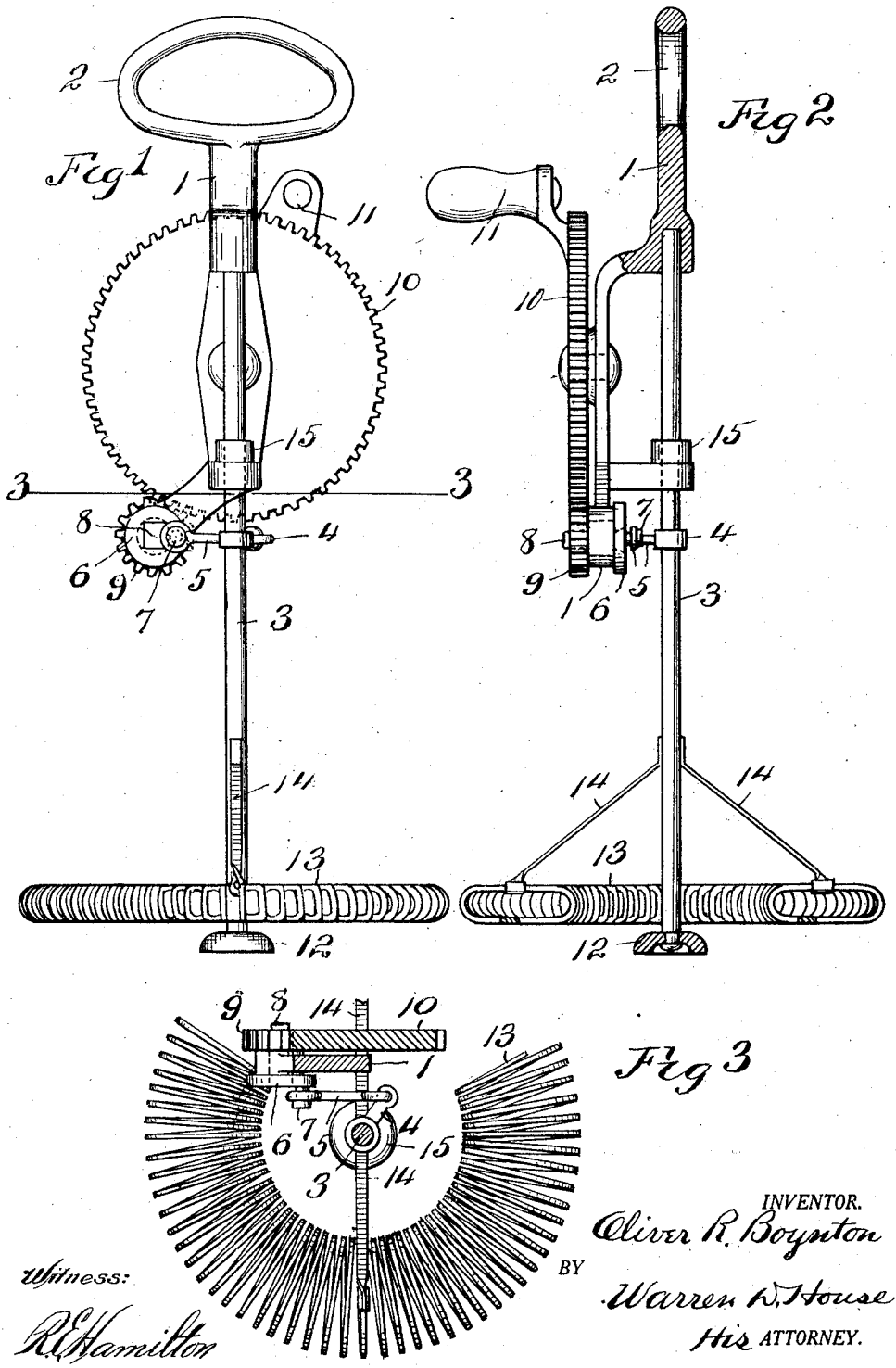

Patented May 3, 1927.

1,627,314

UNITED STATES PATENT OFFICE.

OLIVER R. BOYNTON, OF KANSAS CITY, MISSOURI.

EGG BEATER.

Application filed October 5, 1925. Serial No. 60,490.

My invention relates to improvements in egg beaters.

One of the objects of my invention is to provide an egg beater which is simple, cheap, durable, not liable to get out of order, and which is particularly well adapted for successfully properly beating storage eggs.

The novel features of my invention are hereinafter fully described and claimed.

In the accompanying drawing, which illustrates the preferred embodiment of my invention, Fig. 1 is a side elevation of my improved egg beater.

Fig. 2 is another side view partly in elevation and partly in vertical section.

Fig. 3 is a cross section, partly broken away, on the line 3—3 of Fig. 1.

Similar reference characters designate similar parts in the different views.

1 designates suitable bearing means, preferably comprising a casting having at its upper end a handhold 2, and having oscillatably mounted in it a vertical rock shaft 3, which is provided with a crank arm 4 to which is pivotally connected a link 5, which is eccentrically pivotally connected to a rotary member 6, by being pivoted to a crank pin 7 with which the member 6 is provided.

In the bearing member 1 is mounted a rotary shaft 8 on one end of which is fastened the rotary member 6, and on the other end of which is fastened a pinion 9, which meshes with a spur gear wheel 10 rotatably mounted on the member 1, and which is provided with an operating crank arm 11.

The lower end of the rock shaft 3 is oscillatable in a supporting member or button 12, which is carried by the rock shaft and is adapted to rest on the bottom of the container, not shown, which holds the eggs to be beaten.

Supported by the rock shaft 3 is a beater comprising, preferably an annular wire helix 13, which encircles the rock shaft 3 above the member 12, and an arm or arms 14 which are secured to and revolve with the helix 13 and which are secured to and oscillate with the rock shaft 3. The helix is preferably oblong in cross section, as shown, with flat upper and lower sides, but such form is not essential.

A collar 15 is secured to the rock shaft 3, and is adapted to have a bearing against the member 1 to hold the rock shaft 3 from downward relative movement.

In the operation of the beater, the operator holds the handhold 2, and the supporting member 12 rests on the bottom of the container of the materials to be beaten. The drive gear wheel 10 is rotated by means of the crank arm 11, thereby rotating the pinion 9, rotary shaft 8 and member 6. The rotation of the member 6 oscillates the rock shaft 3 by means of the link 5 and crank pin 7, the orbit of the latter being of sufficiently small diameter to effect oscillation of the crank arm 4 and of the rock shaft 3 and helix 13.

While my beater may be utilized for various purposes, such as mixing different materials and beating fresh eggs, it is particularly well adapted for beating storage eggs, which are difficult and, sometimes, impossible to properly beat with the usual egg beaters, the storage eggs being stale and not capable of being beaten to the consistency of beaten fresh eggs, with the beaters usually employed for beating eggs.

By having the rock shaft arranged to wholly support the bearing means for the gearing which oscillates the shaft, and by having the supporting member 12 carried by the rock shaft, a very simple, cheap and easily cleaned structure is effected, and which permits of the use of the device in a container having an inner diameter but slightly larger than the diameter of the beater.

I do not limit my invention to the structure shown and described, as many modifications, within the scope of the appended claims, may be made without departing from the spirit of my invention.

What I claim is:—

1. In an egg beater, bearing means having a handhold, a rock shaft oscillatable on and supporting said bearing means and having a crank arm, a beater comprising an annular wire helix encircling said shaft, and an arm secured to said helix and to said shaft, and means for oscillating said crank arm.

2. In an egg beater, bearing means having a handhold, a rock shaft oscillatable on and supporting said bearing means, a supporting member in which said shaft is oscillatable, a beater comprising an annular wire helix encircling said shaft above said support, and an arm secured to said helix and to said shaft, and means for oscillating said shaft.

3. An egg beater comprising bearing means, a rock shaft wholly supporting said bearing means and oscillatable thereon, a beater carried by said rock shaft wholly below said bearing means, and means carried by said bearing means for oscillating said rock shaft.

4. An egg beater comprising bearing means, a rock shaft wholly supporting said bearing means and oscillatable thereon, a beater carried by said rock shaft wholly below said bearing means, means carried by said bearing means for oscillating said rock shaft, and a support carried by said rock shaft wholly below said beater and on which the rock shaft is oscillatable.

In testimony whereof I have signed my name to this specification.

OLIVER R. BOYNTON.